US010330157B2

(12) United States Patent
Arnt et al.

(10) Patent No.: US 10,330,157 B2
(45) Date of Patent: Jun. 25, 2019

(54) ROTATING CONTROL DEVICE WITH ROTARY LATCH

(71) Applicant: Halliburton Energy Services, Inc., Houston, TX (US)

(72) Inventors: Anton K. Arnt, Dallas, TX (US); Owen R. Clark, Dallas, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 129 days.

(21) Appl. No.: 14/904,935

(22) PCT Filed: Aug. 29, 2013

(86) PCT No.: PCT/US2013/057326
§ 371 (c)(1),
(2) Date: Jan. 13, 2016

(87) PCT Pub. No.: WO2015/030775
PCT Pub. Date: Mar. 5, 2015

(65) Prior Publication Data
US 2016/0123399 A1 May 5, 2016

(51) Int. Cl.
*E21B 17/00* (2006.01)
*E21B 33/06* (2006.01)
(Continued)

(52) U.S. Cl.
CPC .......... *F16C 35/067* (2013.01); *E21B 17/006* (2013.01); *E21B 33/085* (2013.01); *F16C 33/78* (2013.01); *F16C 35/042* (2013.01)

(58) Field of Classification Search
CPC ... E21B 17/006; E21B 33/085; E21B 33/0415
(Continued)

(56) References Cited

U.S. PATENT DOCUMENTS 3,251,611 A * 5/1966 Haeber ................. E21B 33/038
166/338
5,013,178 A 5/1991 Baker et al.
(Continued)

FOREIGN PATENT DOCUMENTS

EP 1659260 A2 5/2006
GB 2235739 3/1991
(Continued)

OTHER PUBLICATIONS

International Search Report and Written Opinion of PCT Application No. PCT/US2013/057326 dated May 26, 2014: pp. 1-15.

*Primary Examiner* — Giovanna C Wright
*Assistant Examiner* — Dany E Akakpo
(74) *Attorney, Agent, or Firm* — Chamberlain Hrdlicka (57) ABSTRACT

A rotating control device can include an annular seal, and a latch including a rotary cam and an engagement member which releasably secures the seal and/or a bearing relative to the housing, such that rotation of the cam relative to the housing displaces the member. A method of latching an annular seal relative to an outer housing of a rotating control device can include rotating a rotary cam, thereby linearly displacing an engagement member that releasably secures the seal relative to the housing while permitting rotation of the seal relative to the housing. Another rotating control device can include an outer housing, an annular seal, and a latch including a rotary cam and multiple separate engagement members disposed in the housing, and in which rotation of the cam relative to the housing displaces the members in the housing.

20 Claims, 10 Drawing Sheets (51) Int. Cl.
*F16C 35/067* (2006.01)
*E21B 33/08* (2006.01)
*F16C 33/78* (2006.01)
*F16C 35/04* (2006.01)

(58) Field of Classification Search
USPC .............................................. 166/84.1, 84.3
See application file for complete search history.

(56) References Cited

U.S. PATENT DOCUMENTS

| | | | |
|---|---|---|---|
| 5,566,761 A | 10/1996 | Pallini, Jr. et al. | |
| 5,662,171 A | 9/1997 | Brugman et al. | |
| 6,016,880 A | 1/2000 | Hall et al. | |
| 6,244,359 B1 | 6/2001 | Bridges et al. | |
| 7,316,430 B2 * | 1/2008 | Biester | E21B 33/038 166/338 |
| 7,487,837 B2 | 2/2009 | Bailey et al. | |
| 7,926,593 B2 | 4/2011 | Bailey et al. | |
| 8,047,295 B2 | 11/2011 | Skeels et al. | |
| 8,424,842 B2 | 8/2013 | Bussear | |
| 2001/0011592 A1 | 8/2001 | Baker | |
| 2003/0102136 A1 * | 6/2003 | Nelson | E21B 33/085 166/387 |
| 2006/0000599 A1 | 1/2006 | Biester | |
| 2006/0108119 A1 | 5/2006 | Bailey et al. | |
| 2009/0200747 A1 | 8/2009 | Williams | |
| 2012/0013133 A1 | 1/2012 | Rios, III et al. | |
| 2012/0125598 A1 | 5/2012 | Godfrey et al. | |

FOREIGN PATENT DOCUMENTS

| | | |
|---|---|---|
| GB | 2339872 A | 2/2000 |
| RU | 2011148966 | 6/2013 |
| WO | 1999018323 A1 | 4/1999 |
| WO | 2012052402 | 4/2012 |

\* cited by examiner

ROTATING CONTROL DEVICE WITH ROTARY LATCH

TECHNICAL FIELD

This disclosure relates generally to equipment utilized and operations performed in conjunction with a subterranean well and, in one example described below, more particularly provides a rotating control device with a rotary latch.

BACKGROUND

A rotating control device (RCD, also known as a rotating head, rotating blowout preventer and rotating diverter) is used to seal off an annulus about a rotatable tubular (such as, part of a drill string or other tubular string) at or near the earth's surface. For this purpose, the rotating control device includes an annular seal, which may rotate with the tubular. Bearings can be used to allow the seal to rotate relative to an outer housing of the rotating control device.

It is beneficial to be able to releasably latch the seal and/or bearings relative to the outer housing, so that the seal and/or bearings could be conveniently installed and removed when desired. Thus, it will be appreciated that improvements are continually needed in the arts of constructing and operating latches for rotating control devices.

DETAILED DESCRIPTION

Figure 1:
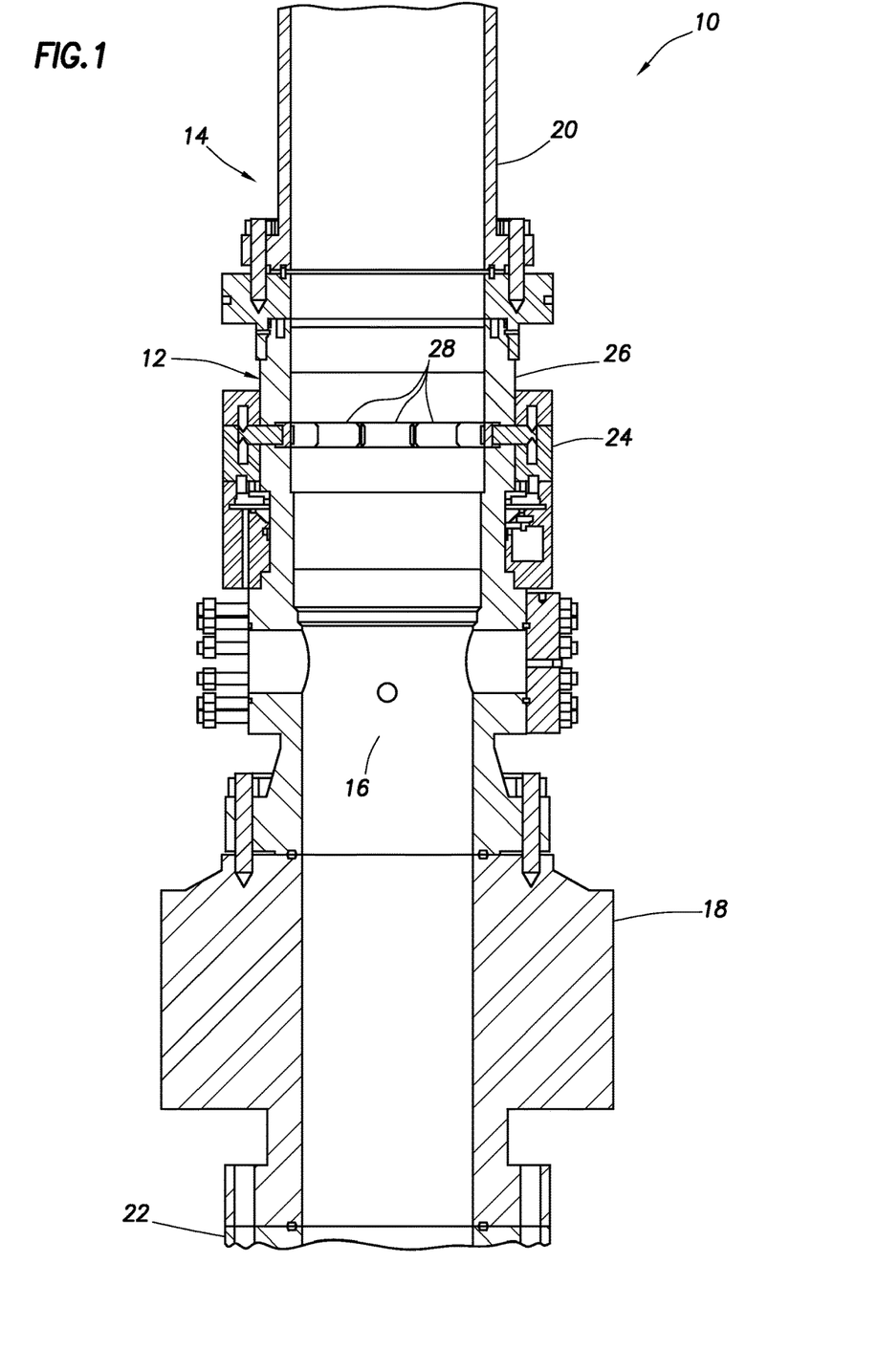
FIG. 1 is a representative cross-sectional view of a well system and associated method which can embody principles of this disclosure.

FIG. 1 is a representative cross-sectional view of a well system 10 and associated method which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a rotating control device (RCD) 12 is connected as part of a riser string 14, so that a flow passage 16 of the riser string extends longitudinally through the RCD. The RCD 12 is connected between an annular blowout preventer (BOP) 18 and a diverter tie-back 20. However, in other examples, the RCD 12 is not necessarily connected as part of a riser string (e.g., the RCD could be used with a land-based rig), and the RCD is not necessarily connected between any particular well tools or components.

The BOP 18 can be connected to various types of structures 22 (for example, a tensioner ring of the riser string 14, a wellhead or a lower marine riser package (LMRP)), so that the passage 16 is in communication with a wellbore (not shown). The diverter tie-back 20 can be connected to a rig diverter (not shown) of a floating or jack-up drilling rig. However, the scope of this disclosure is not limited to use of the RCD 12 with any particular type of drilling rig, or to any particular arrangement or configuration of components or well tools above or below the RCD.

The RCD 12 includes a rotary latch 24 for releasably securing a seal and bearing assembly (see FIG. 2) in an outer housing 26 of the RCD. In FIG. 1, it can be seen that the latch 24 includes multiple engagement members 28 that are circumferentially distributed in the outer housing 26.

Figure 2:
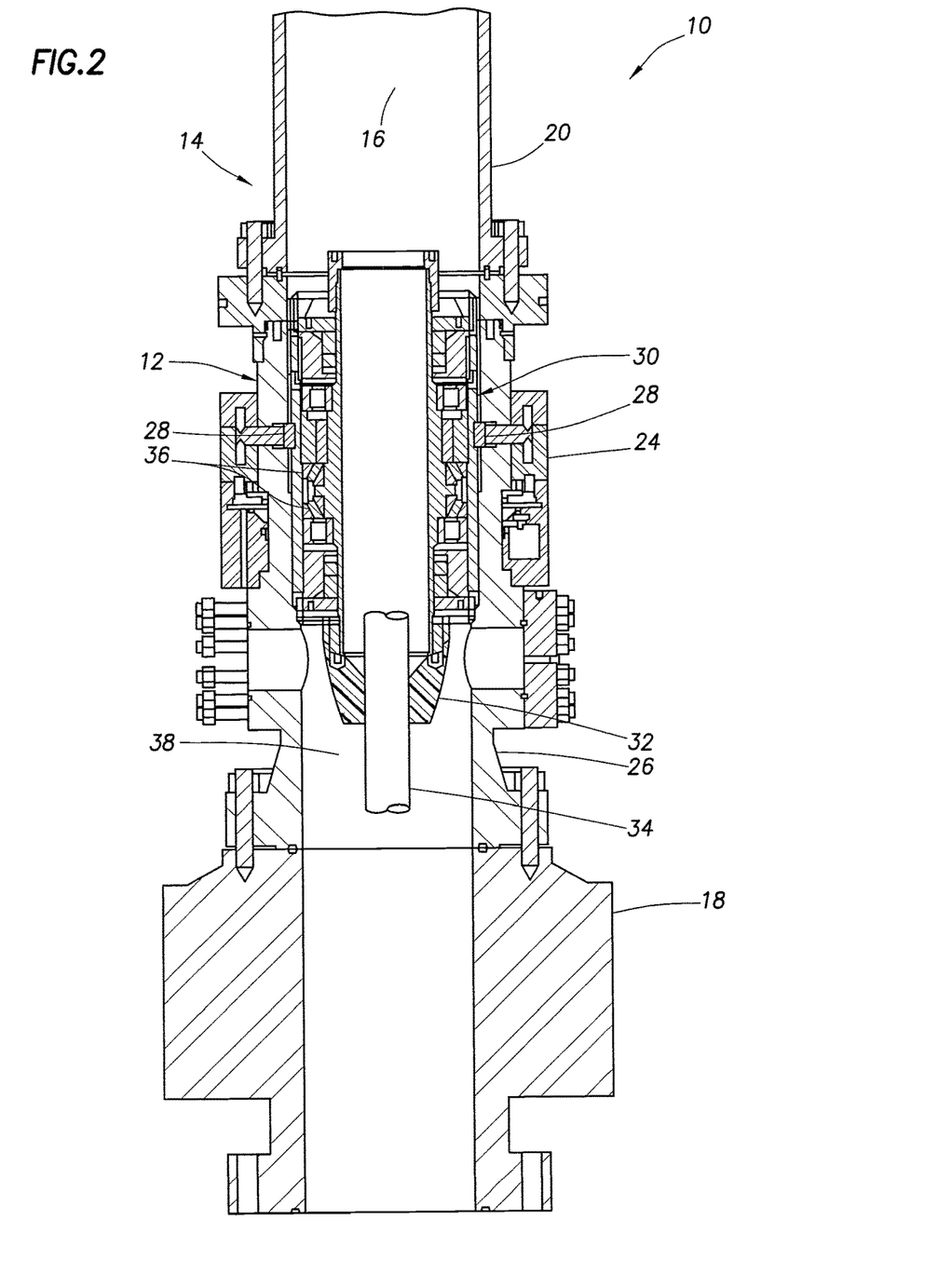
FIG. 2 is a representative cross-sectional view of the well system and method of FIG. 1, with a seal and bearing assembly latched into a rotating control device outer housing.

FIG. 2 is a representative cross-sectional view of the well system 10 and method of FIG. 1, with a seal and bearing assembly 30 latched into the rotating control device outer housing 26. In this configuration, an annular seal 32 of the assembly 30 can sealingly engage an exterior of a tubular 34 (such as a drill pipe) inserted in the passage 16.

The assembly 30 includes bearings 36, which permit the seal 32 to rotate relative to the outer housing 26. In this manner, the seal 32 can rotate with the tubular 34 while sealing off an annular space 38 formed radially between the tubular and the outer housing 26. The latch 24 releasably secures the assembly 30 against removal from the outer housing 26.

In the FIGS. 1 & 2 example, the latch 24 releasably secures both the seal 32 and the bearings 36 against removal from the RCD 12. However, in other examples, the latch 24 could releasably secure only the seal 32, or only the bearings 36 (e.g., if the seal is separately removable from the outer housing 26). Thus, the scope of this disclosure is not limited to use of any particular type of seal and bearing assembly, or to use of an assembly which includes both a seal and bearings.

Only one seal 32 is depicted in FIG. 2, and the seal is illustrated as being of the type known to those skilled in the art as a "passive" seal. However, in other examples, multiple seals could be used, and some or all of the seals could be "active" seals. The seal 32 is not necessarily positioned within the outer housing 26. Thus, it will be appreciated that the scope of this disclosure is not limited to use of any particular number, position or type(s) of annular seals.

As described more fully below, the latch engagement members 28 can be displaced radially relative to the outer housing 26 between a position in which removal of the seal and bearing assembly 30 from the RCD 12 is prevented, and a position in which the seal and bearing assembly can be inserted into or removed from the outer housing 26.

Figure 3:
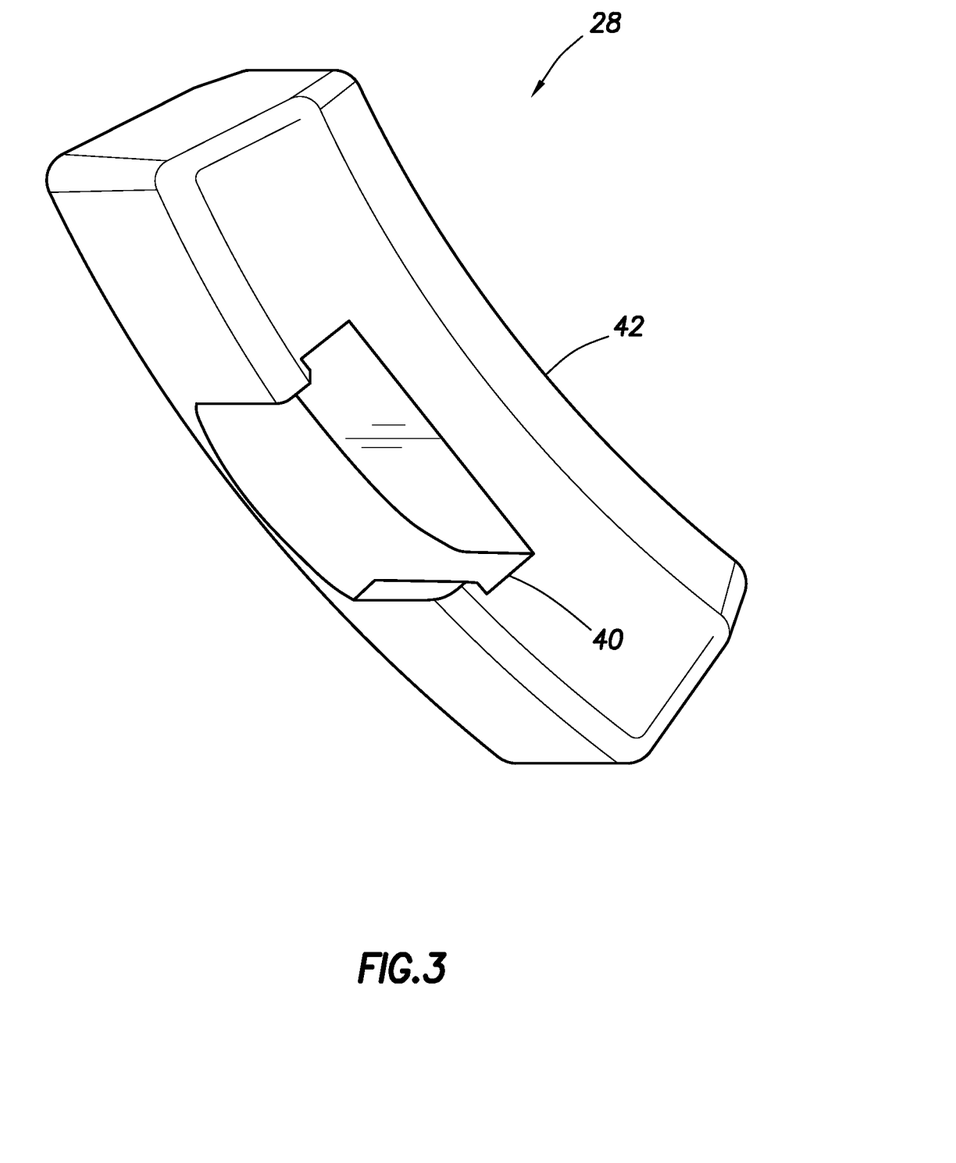
FIG. 3 is an enlarged scale representative perspective view of an engagement member of a rotary latch of the rotating control device.

FIG. 3 is an enlarged scale representative perspective view of one engagement member 28 of the rotary latch 24 of the rotating control device 12. In this view, it can be clearly seen that the member 28 includes a generally T-shaped recess 40 and a concave curved engagement face 42.

The recess 40 is configured for connecting the engagement member 28 to another member described below (see FIGS. 4A & B). The engagement face 42 is configured to complementarily engage an annular recess (see FIGS. 4A & B) formed on the seal and bearing assembly 30.

However, in other examples, the engagement member 28 could be otherwise configured. For example, the engagement member 28 could be threaded or otherwise connected to another member, or the engagement member could be integrally formed with such other member. The curved engagement face 42 could instead be planar, straight or convex. Thus, the scope of this disclosure is not limited to any particular configuration of the engagement member 28.

Figure 4A:
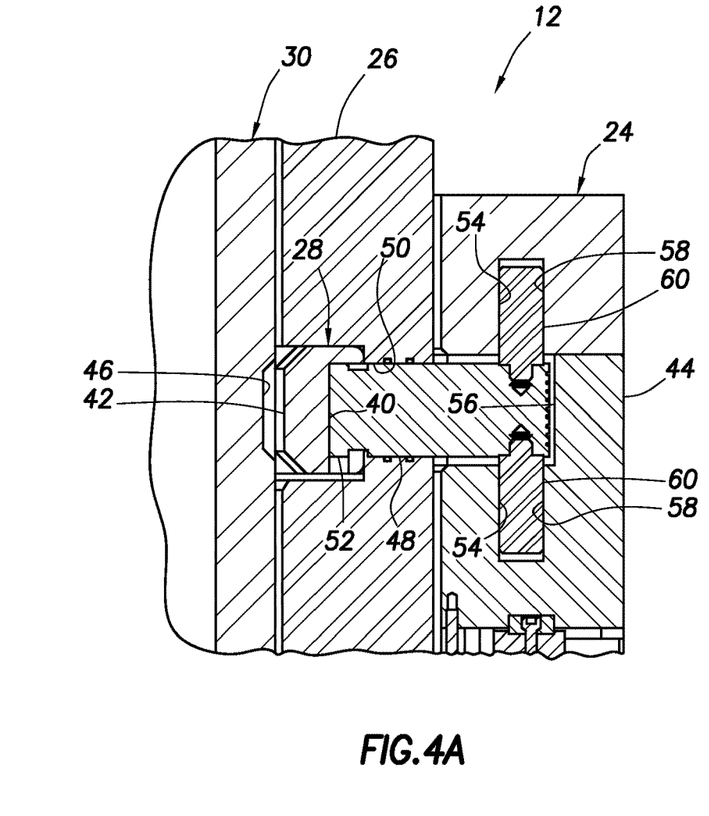
FIGS. 4A & B are representative cross-sectional views of the latch in respective unlatched and latched configurations.
Figure 4B:
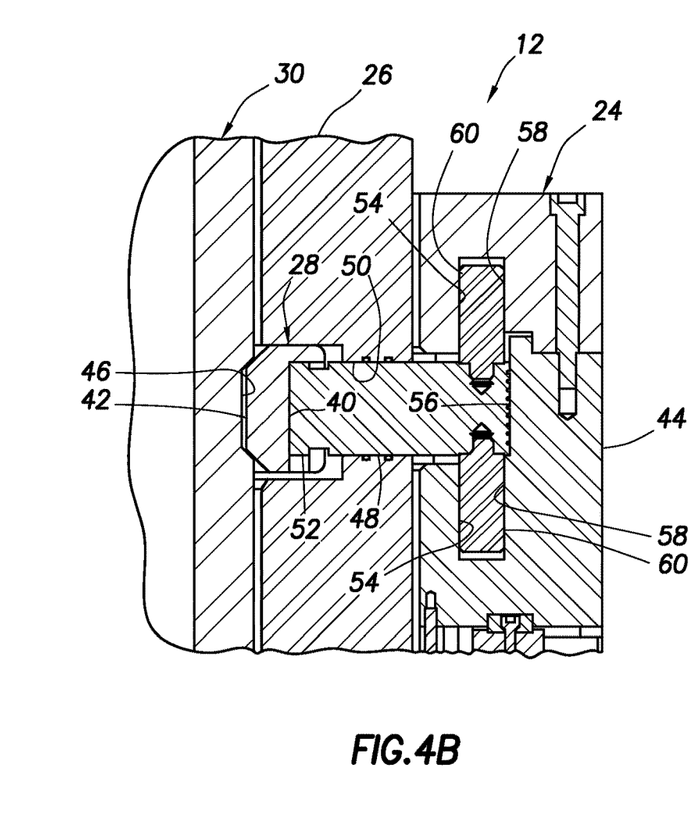

FIGS. 4A & B are representative cross-sectional views of the latch 24 in respective unlatched and latched configurations. In FIG. 4A the engagement member 28 is displaced radially outward by a rotary cam 44 of the latch 24, and in FIG. 4B the engagement member is displaced radially inward by the rotary cam into engagement with an annular recess 46 on the seal and bearing assembly 30.

The seal and bearing assembly 30 can be inserted into or removed from the RCD 12 when the engagement member 28 is in the position depicted in FIG. 4A. The seal and bearing assembly 30 is prevented from being removed from the RCD 12 when the engagement member 28 is in the position depicted in FIG. 4B.

The engagement member 28 is connected to a rod 48 that is sealingly and slidingly received in an opening 50 formed radially through the outer housing 26. The rod 48 includes a head 52 shaped for complementary engagement with the recess 40 in the engagement member 28.

In other examples, the engagement member 28 and rod 48 could be otherwise connected, or they could be integrally formed. Thus, the scope of this disclosure is not limited to any particular configuration of the rod 48, or to any particular manner of connecting the rod to the engagement member 28.

The member 28 and rod 48 are displaced radially inward and outward relative to the outer housing 26 by means of cam profiles 54, 56, 58 formed in the rotary cam 44. When the cam 44 is rotated in one direction, the profiles 54 displace the member 28 and rod 48 radially outward to the FIG. 4A position. When the cam 44 is rotated in an opposite direction, the profiles 56, 58 displace the member 28 and rod 48 radially inward to the FIG. 4B position.

Cam followers 60 are connected to the rod 48 for engaging the cam profiles 54, 58. However, in other examples, the rod 48 and cam followers 60 could be integrally formed, or could be connected to each other by various means (such as, threads or welding). Thus, the scope of this disclosure is not limited to any particular configuration of the rod 48 and cam followers 60.

Although only one set of the engagement member 28, rod 48, cam profiles 54, 56, 58 and cam followers 60 is depicted in FIGS. 4A & B, multiple such sets are circumferentially distributed relative to the outer housing 26. The rotary cam 44 is used to displace these multiple engagement members 28, rods 48 and cam followers 60 radially inward and outward, using the respective multiple sets of cam profiles 54, 56, 58.

Figure 5:
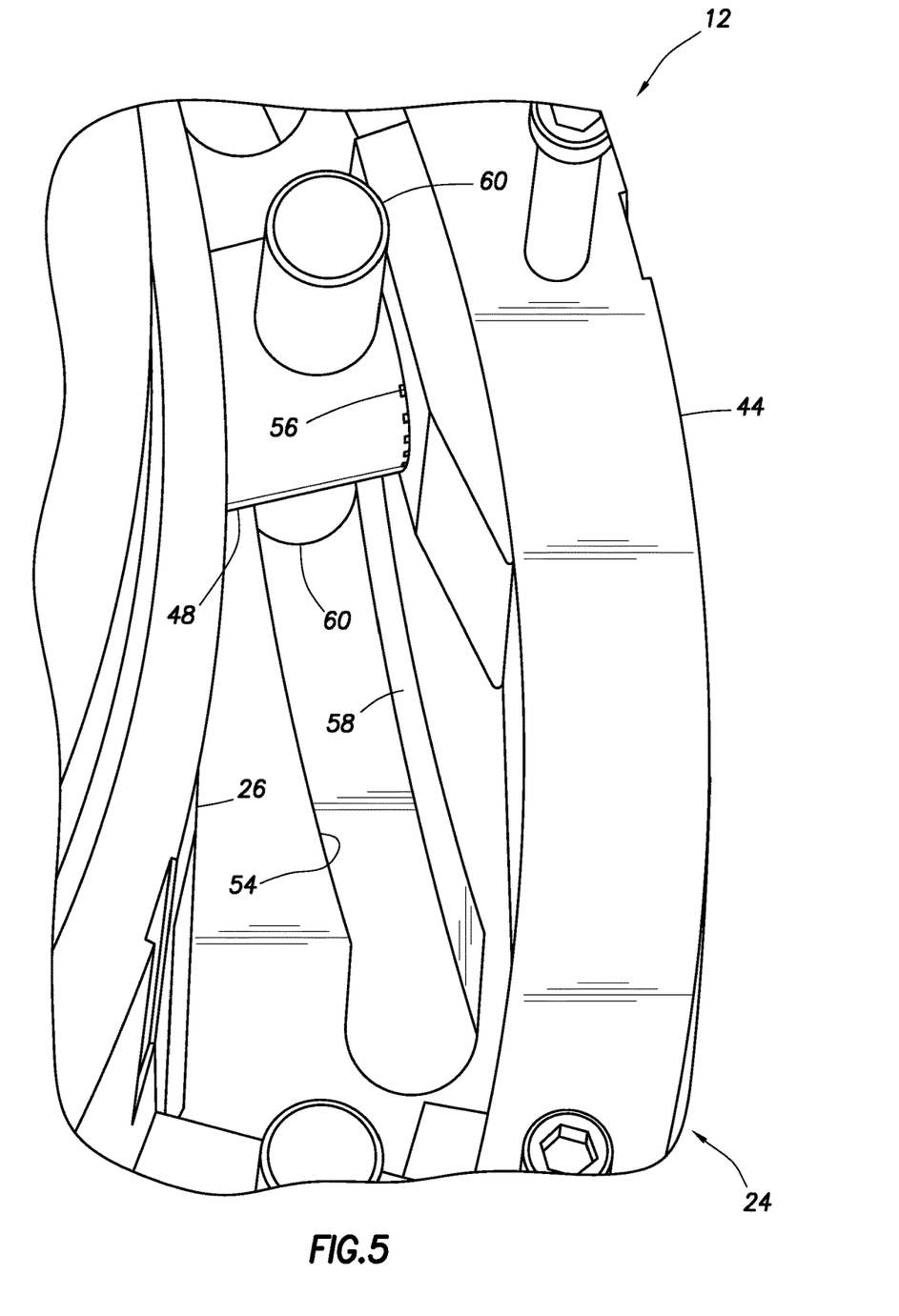
FIG. 5 is a representative perspective view of cam profiles of the rotary latch.

FIG. 5 is a representative perspective view of the cam profiles 54, 56, 58 of the rotary latch 24. An upper portion of the rotary cam 44 has been removed, so that the cam profiles 54, 56, 58 therein can be seen.

Each of the cam profiles 54, 56, 58 is inclined radially so that, as the cam 44 is rotated, the rod 48 and/or cam followers 60 are biased by the cam profiles to displace radially inward or outward (depending on the direction of rotation of the cam). Note that the cam profile 56 is configured so that it engages an end of the rod 48.

In addition, note that each of the cam profiles 56, 58 is configured so that, when the engagement member 28 (see FIGS. 4A & B) is engaged with the seal and bearing assembly 30, the rod 48 and cam followers 60 do not contact radially inclined portions of the cam profiles 56, 58. This prevents outward biasing of the rod 48 (for example, due to pressure in an interior of the RCD 12) from causing rotation of the cam 44, which could otherwise be caused by contact of the rod and/or cam followers 60 with radially inclined portions of the cam profiles 56, 58.

Figure 6:
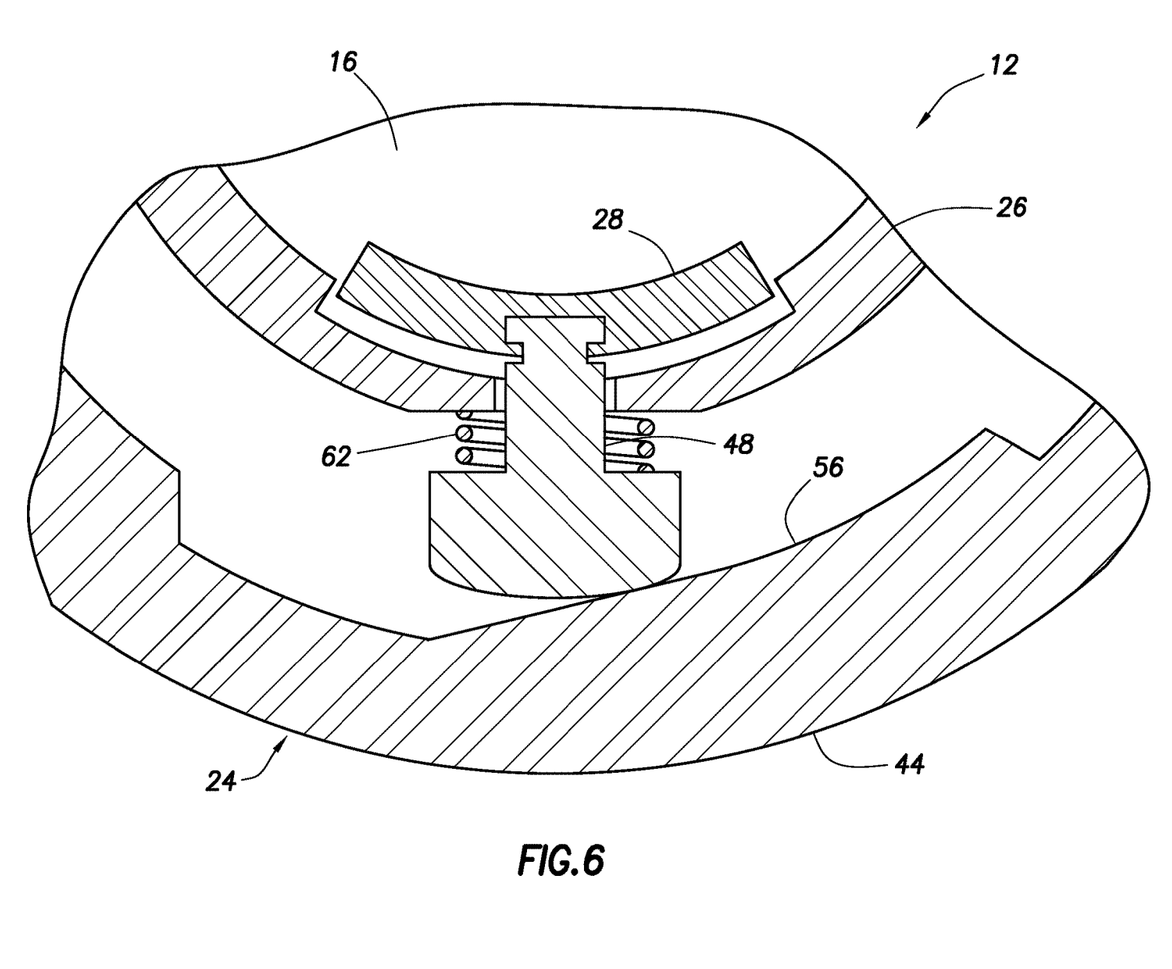
FIG. 6 is a representative cross-sectional view of another example of the rotary latch.

FIG. 6 is a representative cross-sectional view of another example of the rotary latch 24. In this example, a biasing device 62 (such as a compression spring) is used to displace the engagement member 28 and rod 48 radially outward. The cam profile 54 is not used to outwardly displace the member 28 and rod 48. Thus, the scope of this disclosure is not limited to use of any particular number or arrangement of cam profiles in the rotary latch 24.

Figure 7:
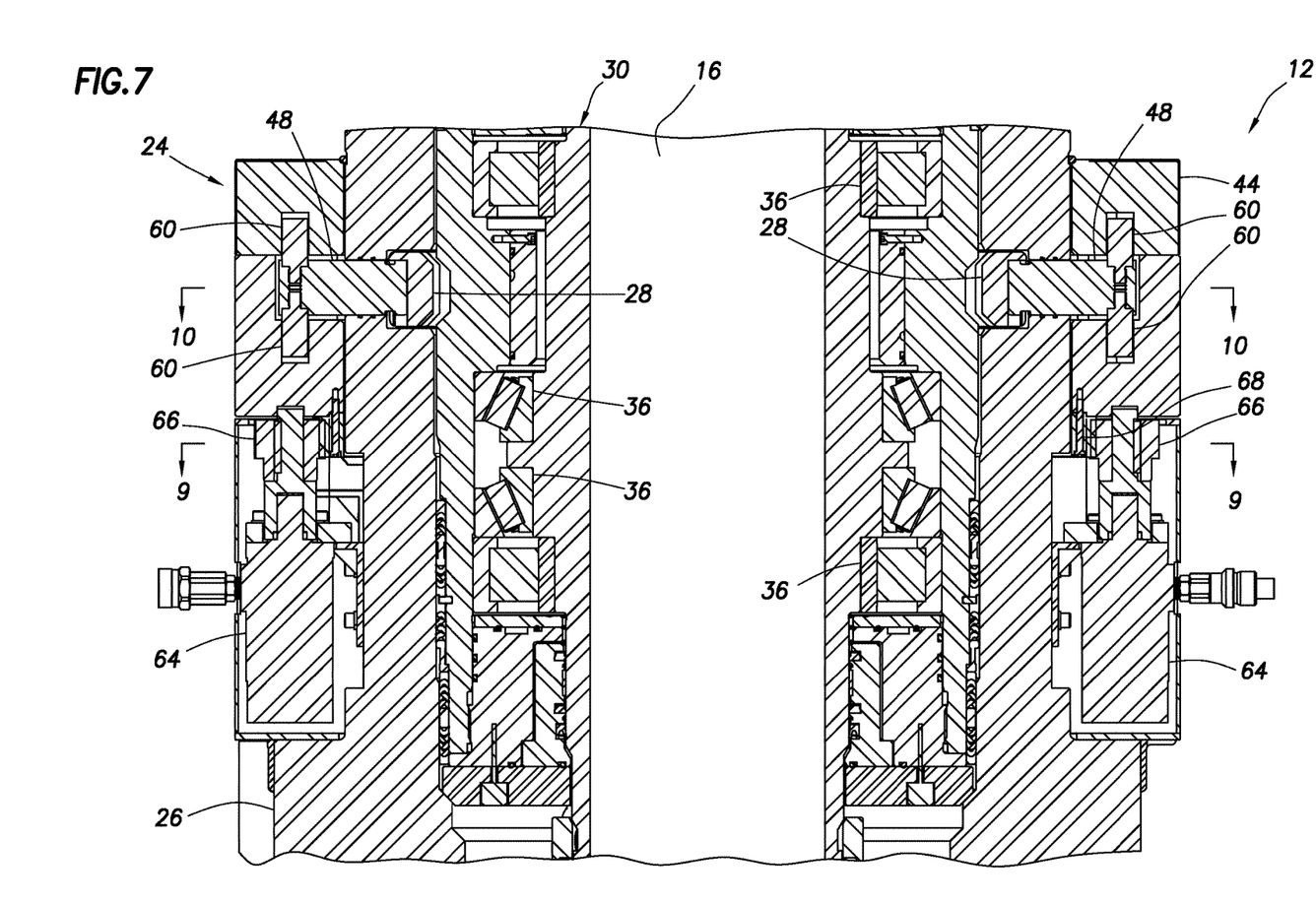
FIG. 7 is a representative cross-sectional view of the rotating control device.

FIG. 7 is a representative cross-sectional view of the rotating control device 12. In this view, it may be seen that multiple motors 64 can be used to rotate the rotary cam 44.

In this example, the motors 64 are mounted to the outer housing 26 and each of the motors has a pinion gear 66 on its shaft. The pinion gears 66 engage a ring gear 68 mounted on the rotary cam 44. Thus, the motors 64 rotate the pinion gears 66, which rotate the ring gear 68, and this causes the rotary cam 44 to rotate.

The motors 64 can be any type of motors suitable for causing rotation of the cam 44. For example, electrical, pneumatic or hydraulic motors could be used.

In other examples, devices other than motors (such as, hydraulically or pneumatically actuated pistons and cylinders acting through a lever arm to rotate the cam 44, or other types of actuators) could be used to rotate the cam 44. Thus, the scope of this disclosure is not limited to use of any particular means for rotating the cam 44.

Figure 8:
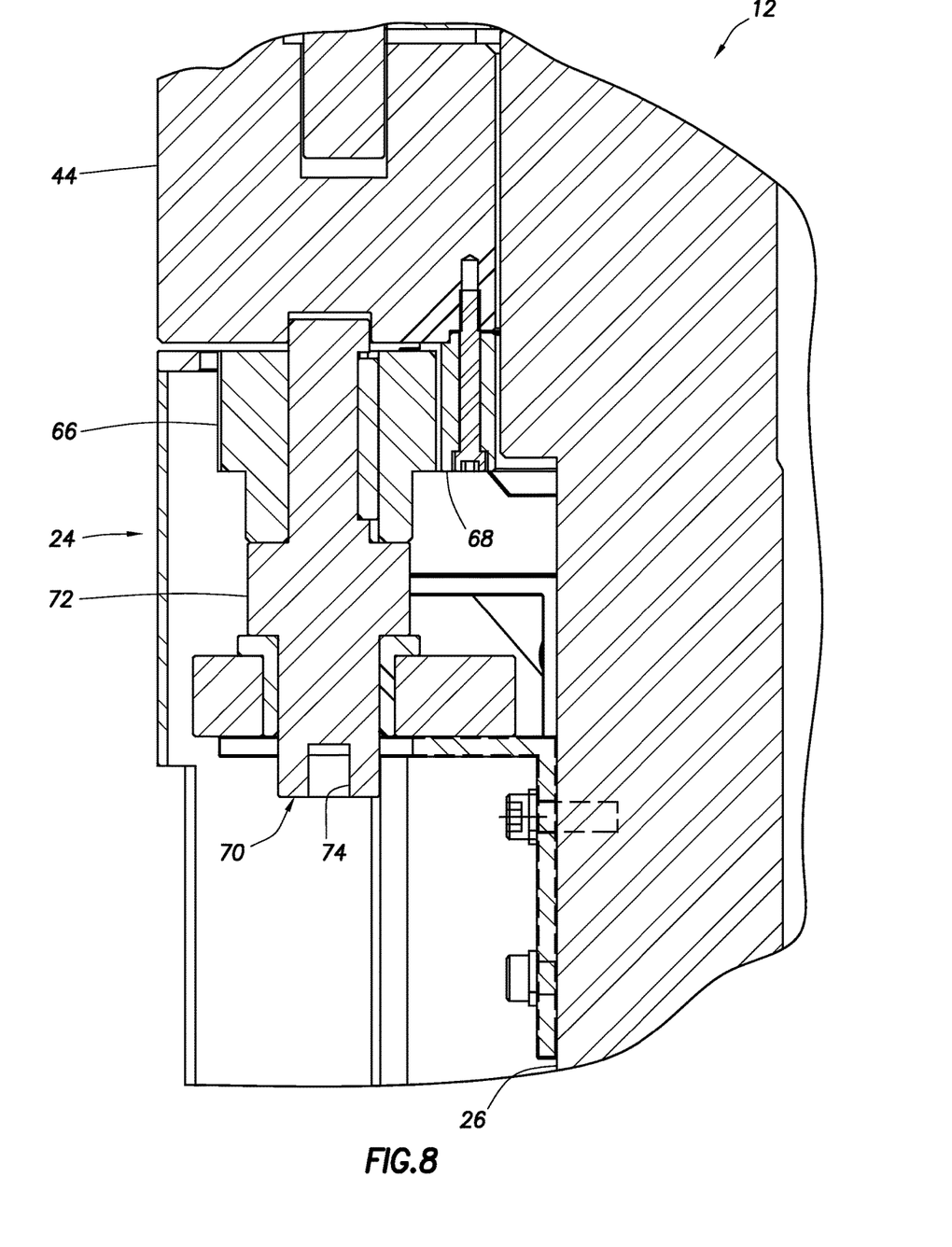
FIG. 8 is a representative cross-sectional view of a manual rotation mechanism of the rotary latch.

FIG. 8 is a representative cross-sectional view of a manual rotation mechanism 70 of the rotary latch 24. The manual rotation mechanism 70 permits the cam 44 to be rotated by hand, for example, if the motors 64 are not functional (e.g., due to loss of electrical, pneumatic or hydraulic power). Multiple manual rotation mechanisms 70 may be provided, if desired.

The manual rotation mechanism 70 includes a shaft 72 having one of the pinion gears 66 secured thereon. The shaft 72 is rotatably secured to the outer housing 26.

The pinion gear 66 engages the ring gear 68, as described above for rotation of the cam 44 using the motors 64. However, in the FIG. 8 example, the pinion gear 66 can be rotated by hand using, for example, a socket 74 formed in an end of the shaft 72. The socket 74 can be engaged with a suitably configured hand tool (not shown).

Figure 9:
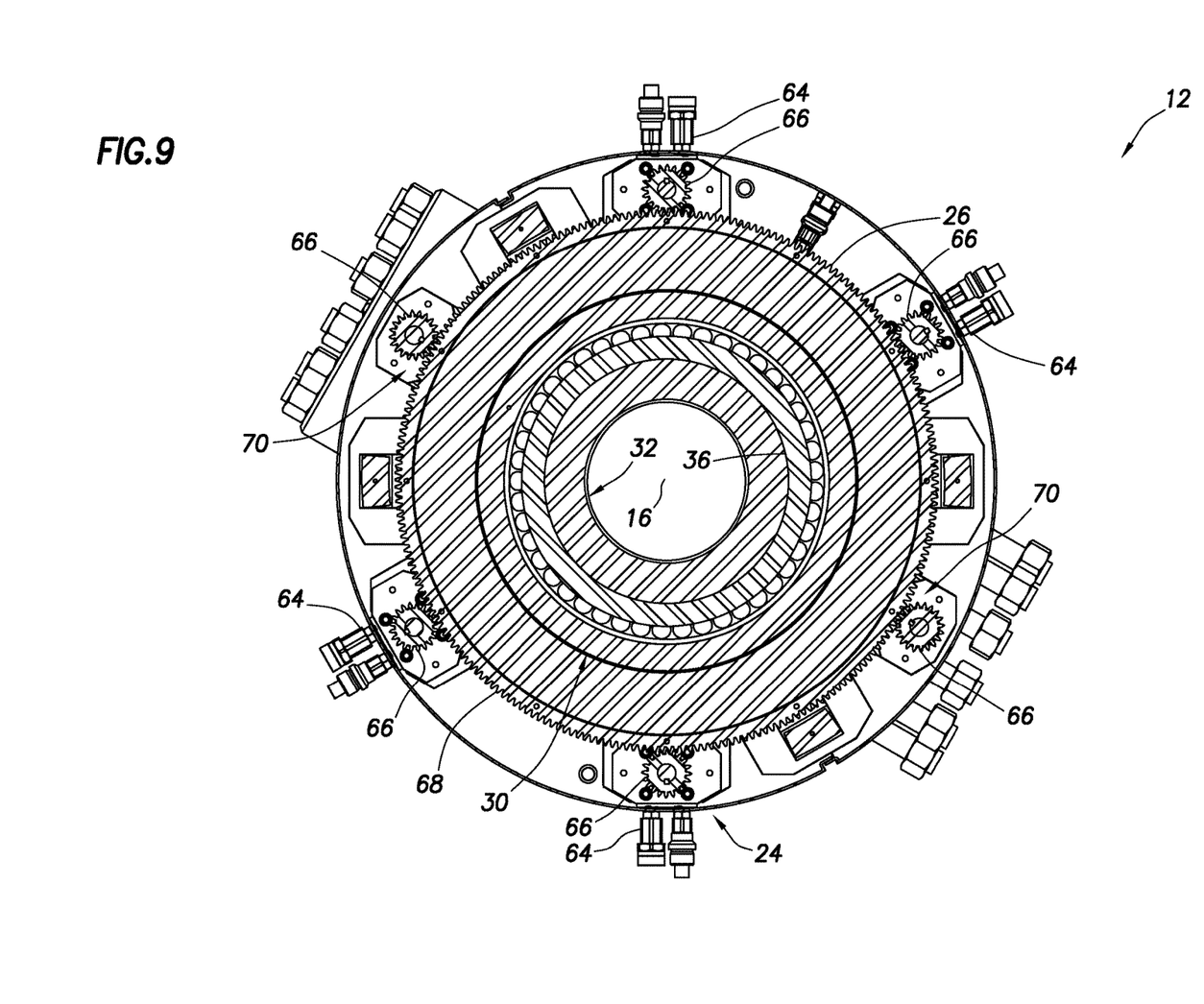
FIG. 9 is a representative cross-sectional view of the rotating control device, taken along line 9-9 of FIG. 7.

FIG. 9 is a representative cross-sectional view of the rotating control device 12, taken along line 9-9 of FIG. 7. In this view, the manner in which the pinion gears 66 are distributed about the ring gear 68 can be clearly seen. In addition, it may be seen that two of the manual rotation mechanisms 70 are used in this example.

Figure 10:
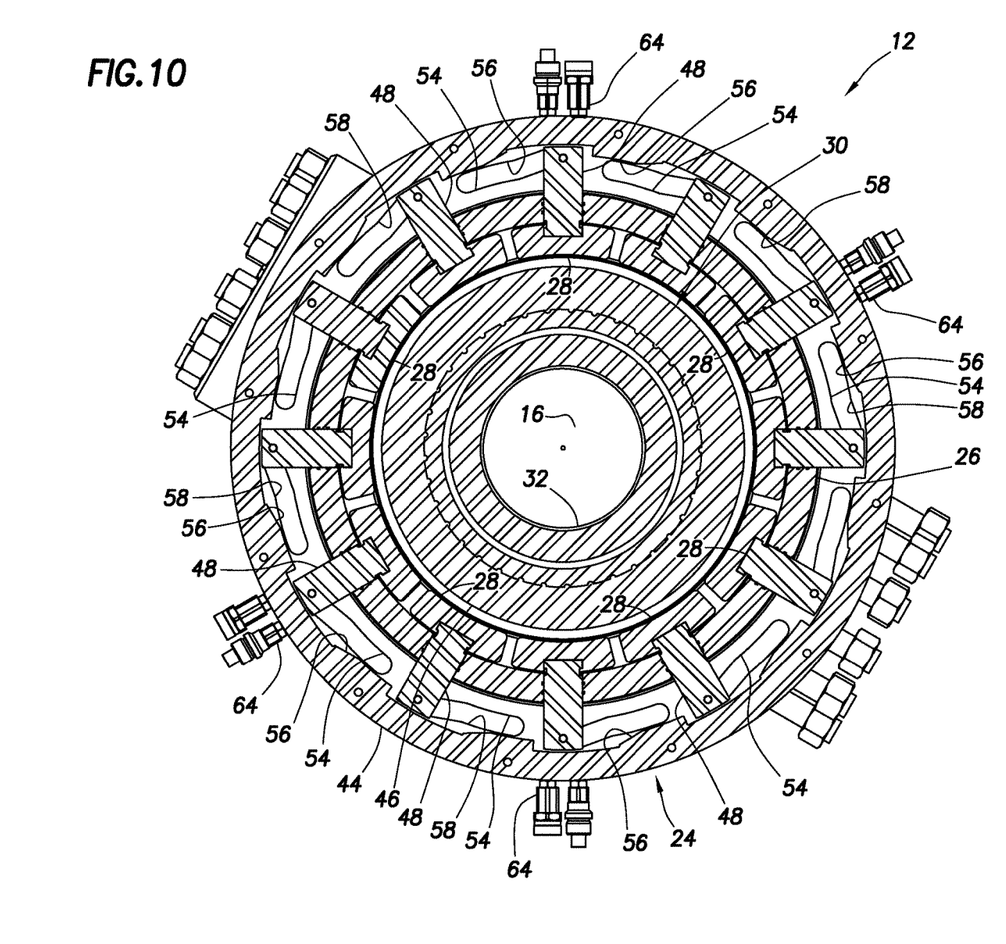
FIG. 10 is a representative cross-sectional view of the rotating control device, taken along line 10-10 of FIG. 7.

FIG. 10 is a representative cross-sectional view of the rotating control device 12, taken along line 10-10 of FIG. 7. In this view, the manner in which the engagement members 28, rods 48 and cam profiles 54, 56, 58 are circumferentially distributed relative to the outer housing 26 can be clearly seen.

All of the engagement members 28 can be conveniently displaced linearly and radially inward and outward by rotation of the rotary cam 44 using the motors 64, or using the manual rotation mechanisms 70 (see FIG. 8). However, other means of displacing and directions of displacing the engagement members 28 could be used, if desired. For example, it is not necessary for the rods 48 to be radially arranged, or for the engagement members 28 to displace only radially. Thus, the scope of this disclosure is not limited to any particular direction of displacement of particular components of the RCD 12.

It may now be fully appreciated that the above disclosure provides significant advancements to the arts of constructing and operating rotating control devices. In examples described above, the seal and bearing assembly 30 can be conveniently secured to and released from the RCD 12 using the rotary latch 24. In these examples, the rotary latch 24 includes the rotary cam 44, which translates rotation of the cam into radial displacement of the engagement members 28.

The above disclosure provides to the art a rotating control device 12 which, in one example, includes an outer housing 26, at least one annular seal 32 rotatable relative to the outer housing 26, and a latch 24 including at least one rotary cam 44 and at least one engagement member 28 which releasably secures relative to the outer housing 26 at least one of the annular seal 32 and a bearing 36. Rotation of the rotary cam 44 relative to the outer housing 26 displaces the engagement member 28.

The annular seal 32 may be rotatable relative to the outer housing 26 when the annular seal 32 is secured by the latch 24 against removal from the outer housing 26.

The rotating control device 12 can comprise a seal and bearing assembly 30 which includes the annular seal 32 and the bearing 36. Removal of the seal and bearing assembly 30 from the outer housing 26 may be prevented by the latch 24.

The latch 24 may include a motor 64 which rotates the rotary cam 44. The latch 24 can further include a gear 68 connected to the rotary cam 44, the gear 68 being driven by the motor 64.

The engagement member 28 may displace radially and/or linearly relative to the outer housing 26 in response to rotation of the rotary cam 44.

The latch 24 can include a rod 48 that displaces through the outer housing 26 in response to rotation of the rotary cam 44.

The engagement member 28 may be displaced outward relative to the outer housing 26, and removal of the annular seal 32 and/or bearing 36 from the outer housing 26 can be permitted, in response to rotation of the rotary cam 44.

The at least one engagement member 28 may comprise multiple engagement members 28 circumferentially distributed in the outer housing 26.

A method of releasably latching at least one annular seal 32 relative to an outer housing 26 of a rotating control device 12 is also described above. In one example, the method comprises: rotating a rotary cam 44, thereby linearly displacing an engagement member 28 that releasably secures the annular seal 32 relative to the outer housing 26. Rotation of the annular seal 32 relative to the outer housing 26 is permitted when the engagement member 28 is displaced to a position in which removal of the annular seal 32 is prevented.

The rotating step can comprise rotating the rotary cam 44 by hand and/or with a motor 64. The rotating step can comprise rotating a gear 68 with the motor 64. The gear 68 may be connected to the rotary cam 44 and encircle the outer housing 26.

The rotating control device 12 can comprise a bearing 36. Removal of the bearing 36 from the outer housing 26 may be prevented when the engagement member 28 is displaced to a position in which removal of the annular seal 32 is prevented.

The engagement member 28 may displace radially relative to the outer housing 26 in response to the rotating step. A rod 48 may displace through the outer housing 26 in response to the rotating step.

The rotating step can comprise displacing the engagement member 28 outward relative to the outer housing 26, thereby permitting removal of the annular seal 32 from the outer housing 26.

Also described above is a rotating control device 12 which, in one example, includes an outer housing 26, at least one annular seal 32 rotatable relative to the outer housing 26, and a latch 24 including at least one rotary cam 44 and multiple separate engagement members 28 disposed in the outer housing 26. Rotation of the rotary cam 44 relative to the outer housing 26 displaces the engagement members 28 in the outer housing 26.

The latch 24 can include multiple rods 48 that displace through the outer housing 26 in response to rotation of the rotary cam 44. The engagement members 28 may be displaced by multiple respective cam profiles 54, 56, 58 formed on the rotary cam 44.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A rotating control device, comprising:
    an outer housing;
    at least one annular seal;
    a latch including at least one rotary cam and at least one engagement member which releasably secures relative to the outer housing either the annular seal or a bearing, wherein rotation of the rotary cam relative to the outer housing displaces the engagement member; and
    a cam follower coupled to the at least one engagement member and engaged with a first cam profile of the rotary cam and a second cam profile of the rotary cam, wherein the first cam profile and the second cam profile are circumferentially distributed relative to the outer housing.

2. The rotating control device of claim 1, wherein the annular seal is rotatable relative to the outer housing when the annular seal is secured by the latch against removal from the outer housing.

3. The rotating control device of claim 1, further comprising a seal and bearing assembly which includes the annular seal and the bearing, and wherein removal of the seal and bearing assembly from the outer housing is prevented by the latch.

4. The rotating control device of claim 1, wherein the latch includes a motor which rotates the rotary cam.

5. The rotating control device of claim 4, wherein the latch further includes a gear connected to the rotary cam, the gear being driven by the motor.

6. The rotating control device of claim 1, wherein the engagement member displaces radially relative to the outer housing in response to rotation of the rotary cam.

7. The rotating control device of claim 1, wherein the engagement member is displaced outward relative to the outer housing, and removal of the at least one of the group comprising the annular seal and the bearing from the outer housing is permitted, in response to rotation of the rotary cam.

8. A method of releasably latching at least one annular seal relative to an outer housing of a rotating control device, the method comprising:
    rotating a rotary cam that comprises a first cam profile and a second cam profile circumferentially distributed relative to the outer housing, thereby linearly displacing an engagement member coupled to a cam follower engaged with the first cam profile and the second cam profile, wherein linearly displacing the engagement member releasably secures the annular seal relative to the outer housing, wherein rotation of the annular seal relative to the outer housing is permitted when the engagement member is displaced to a position in which removal of the annular seal from the outer housing is prevented.

9. The method of claim 8, wherein the rotating further comprises rotating the rotary cam with a motor.

10. The method of claim 9, wherein the rotating further comprises rotating a gear with the motor.

11. The method of claim 8, wherein the rotating control device comprises a bearing, and wherein removal of the bearing from the outer housing is prevented when the engagement member is displaced to a position in which removal of the annular seal is prevented.

12. The method of claim 8, wherein the engagement member displaces radially relative to the outer housing in response to the rotating.

13. The method of claim 8, wherein the rotating further comprises displacing the engagement member outward relative to the outer housing, thereby permitting removal of the annular seal from the outer housing.

14. A rotating control device, comprising:
    an outer housing;
    at least one annular seal;
    a latch including at least one rotary cam and multiple separate engagement members disposed in the outer housing, wherein rotation of the rotary cam relative to the outer housing displaces the engagement members in the outer housing; and
    multiple separate cam followers each coupled to a corresponding one of the multiple separate engagement members and each cam follower is engaged with a respective first cam profile of the rotary cam and a respective second cam profile of the rotary cam, wherein the respective first cam profile and the respective second cam profile are circumferentially distributed relative to the outer housing.

15. The rotating control device of claim 14, wherein the annular seal is rotatable relative to the outer housing when the annular seal is secured by the latch against removal.

16. The rotating control device of claim 14, further comprising a bearing, and wherein removal of the bearing from the outer housing is prevented by the latch.

17. The rotating control device of claim 14, wherein the latch includes at least one motor which rotates the rotary cam.

18. The rotating control device of claim 14, wherein the engagement members displace radially relative to the outer housing in response to rotation of the rotary cam.

19. The rotating control device of claim 14, wherein the engagement members displace linearly relative to the outer housing in response to rotation of the rotary cam.

20. The rotating control device of claim 14, wherein the engagement members are displaced by multiple respective cam profiles formed on the rotary cam.

* * * * *